United States Patent
Calot et al.

[11] Patent Number: 5,881,367
[45] Date of Patent: Mar. 9, 1999

[54] METHOD OF REGULATING THE POWER OF A SIGNAL TRANSMITTED BY A FIRST STATION TO A SECOND STATION IN A SATELLITE TELECOMMUNICATION NETWORK

[75] Inventors: Guillaume Calot, Versailles; Alain Feniou, Courbevoie; Cyril Michel, Paris; Denis Rouffet, Boulogne Billancourt, all of France

[73] Assignee: Alcatel Espace, Cedex, France

[21] Appl. No.: 570,470

[22] Filed: Dec. 11, 1995

[30] Foreign Application Priority Data

Jul. 25, 1995 [FR] France ................................. 95 09007

[51] Int. Cl.$^6$ ................................................... H04B 1/00
[52] U.S. Cl. ........................ 455/69; 455/427; 455/67.1; 455/12.1; 455/13.1
[58] Field of Search ......................... 455/10, 12.1, 52.1, 455/63, 65, 69, 70, 67.1, 67.3, 67.6, 13.1, 427, 428

[56] References Cited

U.S. PATENT DOCUMENTS

| | | | |
|---|---|---|---|
| 4,228,538 | 10/1980 | Scharla-Nielsen et al. | 455/9 |
| 4,648,123 | 3/1987 | Schrock | 455/67 |
| 4,697,187 | 9/1987 | Ohno et al. | 342/358 |
| 4,776,035 | 10/1988 | Duggan | 455/69 |
| 4,901,368 | 2/1990 | Arnold et al. | 455/12 |
| 5,001,776 | 3/1991 | Clark | 455/226 |
| 5,128,965 | 7/1992 | Henriksson | 375/58 |
| 5,278,992 | 1/1994 | Su et al. | 455/69 |
| 5,305,468 | 4/1994 | Bruckert et al. | 455/69 |
| 5,335,249 | 8/1994 | Krueger | 375/1 |

*Primary Examiner*—Reinhard J. Eisenzopf
*Assistant Examiner*—Darnell R. Armstrong
*Attorney, Agent, or Firm*—Sughrue, Mion, Zinn, Macpeak & Seas, PLLC

[57] ABSTRACT

In a telecommunication network, the power of a first signal transmitted via a satellite by a first station to be received in the form of a second signal by a second station is regulated. At a given time, a value representative of a signal-to-noise ratio of the second signal is predicted for a later time, and, at an intermediate time, the power of the first signal is regulated in the first station as a function of the predicted value. The intermediate time precedes the later time by a time period substantially equal to the propagation time between the first and second stations.

17 Claims, 3 Drawing Sheets

METHOD OF REGULATING THE POWER OF A SIGNAL TRANSMITTED BY A FIRST STATION TO A SECOND STATION IN A SATELLITE TELECOMMUNICATION NETWORK

BACKGROUND OF THE INVENTION

1. Field of the Invention

The present invention is generally concerned with satellite telecommunication networks. To be more precise, the invention concerns a method of regulating the power of a first signal transmitted via a satellite from a sending or first station to be received in the form of a second signal by a receiving or second station.

2. Description of the Prior Art

The radio communication channel set up between two stations in a satellite telecommunication network causes variation in both (a)—the received signal level and (b)—the received noise level at the receiving station. The variation in the received signal level is due to the characteristics of the channel. It is the result of fading due to the presence of obstacles, for example, or multiple propagation paths conveying signal components that combine incoherently with the main component of the transmitted signal. The variation in the received noise level is also due to the characteristics of the channel, as with the signal. It can also be the result of variations in the power of the noise source. Thus the signal, so-called first signal, which is transmitted by the sending or first station is transformed into a signal, so-called second signal, when received by the receiving station or second station.

The quality of the link set up through the channel deteriorates if nothing is done to remedy this problem of variation in the received signal components.

A simple solution is to allow a priori for the maximal fluctuations to which the received signal may be subjected. The sending station then sends with a power margin that guarantees the quality of the link regardless of the propagation and interference environment associated with the channel. This solution leads to overrating of the transmission system, to a loss of capacity and to overrating of the power transmitted by the stations.

In the context of land mobile networks, the fluctuations of the signal and noise components in the channel are considerable, possibly as much as several tens of dB, and occur at very high speed. Control or regulation of the power at which the signal is transmitted by the sending station is therefore restricted to correcting the average attenuation of the channel.

A prior art "closed loop" method of controlling the power of a signal transmitted by a sending station is based on the following principle: the receiving station measures the signal-to-noise ratio of the signal received from the sending station. The measured signal-to-noise ratio is sent from the receiving station to the sending station in the form of a message. The latter station corrects the power level of the transmitted signal according to the measurements carried out by the receiving station. The application of this method to the satellite networks mainly used until now, namely networks using satellites in geostationary orbit at an altitude of about 36 000 kms, would seem to be of only limited benefit. In any network of this kind, the round-trip propagation time for a signal between the sending and receiving stations is substantially equal, ignoring processing times, to the reaction time of the power regulation system, which separates the time of transmission of data by the sending station from a subsequent time of correction of the power at which data is transmitted on the basis of measurement of the received signal. For a satellite at around 36 000 kms, the reaction time of the power correction system is approximately 500 ms, which imposes an absolute limit on the possible correction of variations in components of the signal to frequencies below $(1/0.5)=2$ Hz. In practise, given the limitations due to the system, this range can be deemed to have an upper limit of 1 Hz.

The prior art therefore provides no effective method of power control using a "closed loop" type method. A first object of the invention is therefore to provide a method of this kind that is particularly suitable for radiocommunication networks using non-geostationary satellites in low Earth orbit. Nevertheless, the method is applicable to networks using satellite(s) in circular intermediate orbits, geostationary orbits, elliptical orbits, etc. A second object of the invention is to provide a set of two stations for implementing the method of the invention. Still another object of the invention is to provide stations for carrying out the method.

SUMMARY OF THE INVENTION

The invention consists in a method of regulating the power of a first signal transmitted via a satellite from a first station to be received in the form of a second signal by a second station, said method comprising the steps of predicting at a given time a value representative of a signal-to-noise ratio of the second signal at a later time, and, in the first station, at an intermediate time preceding the later time by a time period substantially equal to the propagation time between the first and second stations, regulating the power of the first signal as a function of the predicted signal-to-noise representative value.

In one embodiment, the prediction step includes the sub-steps of measurement by the second station before the given time of a plurality of power levels of the second signal, evaluation of a representative value of a signal-to-noise ratio of the second signal respectively for each of the plurality of measured power levels of the second signal, and extrapolation of the predicted value according to the evaluated representative values.

Preferably, measurement by the second station of the last of the plurality of the power levels of the second signal which are required for the extrapolation precedes the later time by a time period substantially equal to the round-trip propagation time between the first and second stations.

The method can further include the step of measuring an average quality level of the second signal received by the second station over a relatively long time period expiring at the given time, and the regulation of the power of the first signal according to the predicted value may be applied at an intermediate time as a function of a required variation in the representative value of the predicted signal-to-noise ratio, the required variation depending on the difference between the measured average quality level and a reference quality level.

The invention also provides a set of a first station and a second station for implementing the method.

In a first embodiment, the first station comprises means for regulating the power of the first signal transmitted according to the predicted value and the second station comprises means for measuring a plurality of power levels of the second signal. The set comprises in either of the two stations means for evaluating a representative value of a signal-to-noise ratio in the second signal respectively for each of the plurality of measured power levels of the second signal, and means for extrapolating the predicted value according to the evaluated representative values.

In a second embodiment, the second station comprises means for measuring an average quality level of the second signal received by the second station over a relatively long time period expiring at the given time and the set further comprises, in either of the stations, means for adjusting the power regulation of the first signal depending on a required variation of the representative predicted signal-to-noise ratio value, the required variation depending on the difference between the measured average quality level and a reference quality level.

The invention also provides in a satellite telecommunication network, a station for receiving in the form of a second signal, a first signal which is transmitted by another station. The station comprises means for measuring a plurality of power levels of the second signal, means for evaluating a value representative of a signal-to-noise ratio in this second signal respectively for each of the plurality of measured power levels of the second signal, means for extrapolating a predicted representative value of a signal-to-noise ratio of said second signal which will be received at a later time, as a function of said evaluated representative values, and means for transmitting this predicted representative value to the other station.

A station able to operate with this station comprises means for receiving via the satellite from another station a predicted representative value of a signal-to-noise ratio of a second signal which will be received at a later time by this another station, and means for regulating, at a time preceding said later time by a time period substantially equal to the propagation time between both stations, a power of a first signal transmitted by said first station as a function of said predicted value.

Other features and advantages of the present invention will appear more clearly from a reading of the following description with reference to the corresponding appended drawings.

DETAILED DESCRIPTION OF THE PREFERRED EMBODIMENTS

Figure 1:
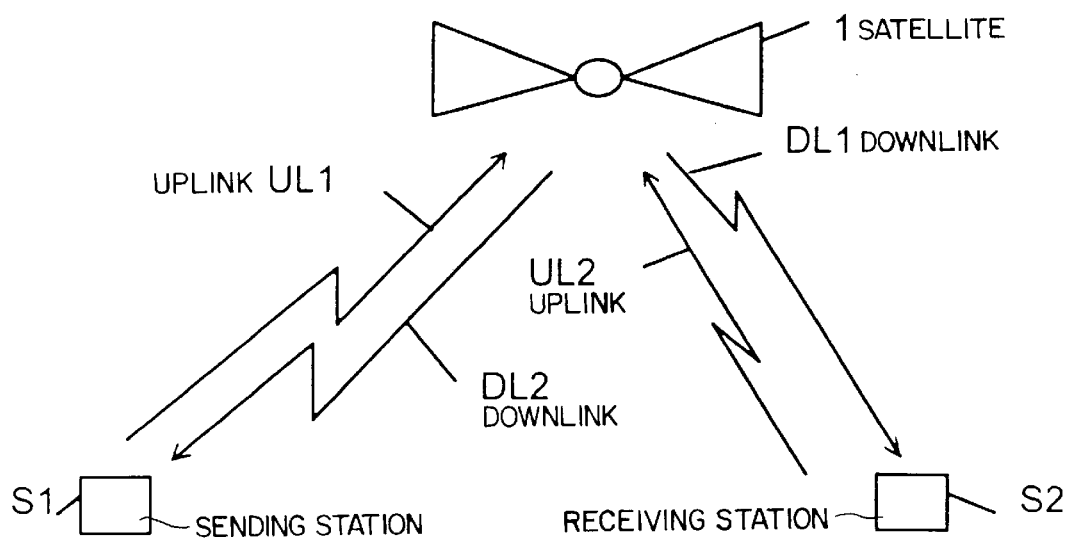
FIG. 1 is a diagram showing a satellite network in which link is set up between two stations.

Referring to FIG. 1, a satellite network is defined by a plurality of stations in the form of connection stations or portable or other mobile stations between which transmission links via a satellite 1 are set up. In FIG. 1 it is assumed that there is a link between the sending station S1 and the receiving station S2. The station S1 transmits, or emits, to the station S2 via an up link UL1 from the station S1 to the satellite 1 and a down link DL1 from the satellite 1 to the station S2. In parallel with this, the station S2 transmits to the station S1 via an up link UL2 from the station S2 to the satellite 1 and a down link DL2 from the satellite 1 to the station S1. The propagation time between station S1 and station S2 is equal to the sum of the propagation time between station S1 and the satellite 1 and the propagation time between the satellite 1 and the station S2. For example, for a satellite in low Earth orbit, for example at an altitude of 1 410 kms, the elevation of which varies between 10° and 90°, the propagation time between the stations S1 and S2 varies between 19 ms and 46 ms according to the position of the satellite.

Use of the invention in a network employing satellites in low Earth orbit has a substantial advantage. The relatively short propagation time of a signal between the stations S1 and S2 leads to a short reaction time for power regulation, or control, by a closed loop type method. For correction times between 19 ms and 46 ms, the theoretical limits of effective power regulation are defined by the two frequencies of variation of components of noise or the signal respectively equal to $1/0.019=52.6$ Hz and $1/0.046=21.7$ Hz. In practise the method is effective up to only 30% of these theoretical limiting values, i.e. for fluctuations in the components of the signal below $52\times0.3\cong16$ Hz and $21\times0.3\cong6.5$ Hz.

Figure 2:
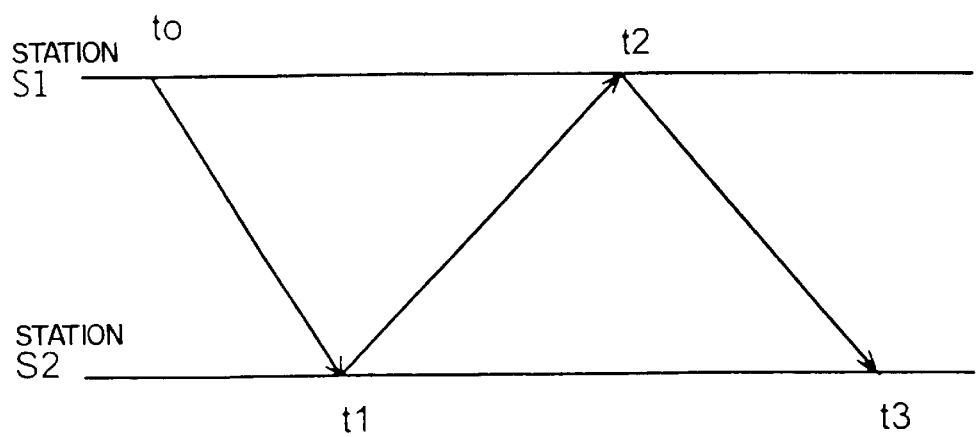
FIG. 2 is a timing diagram for propagation of signals transmitted between the two stations in FIG. 1.
Figure 3:
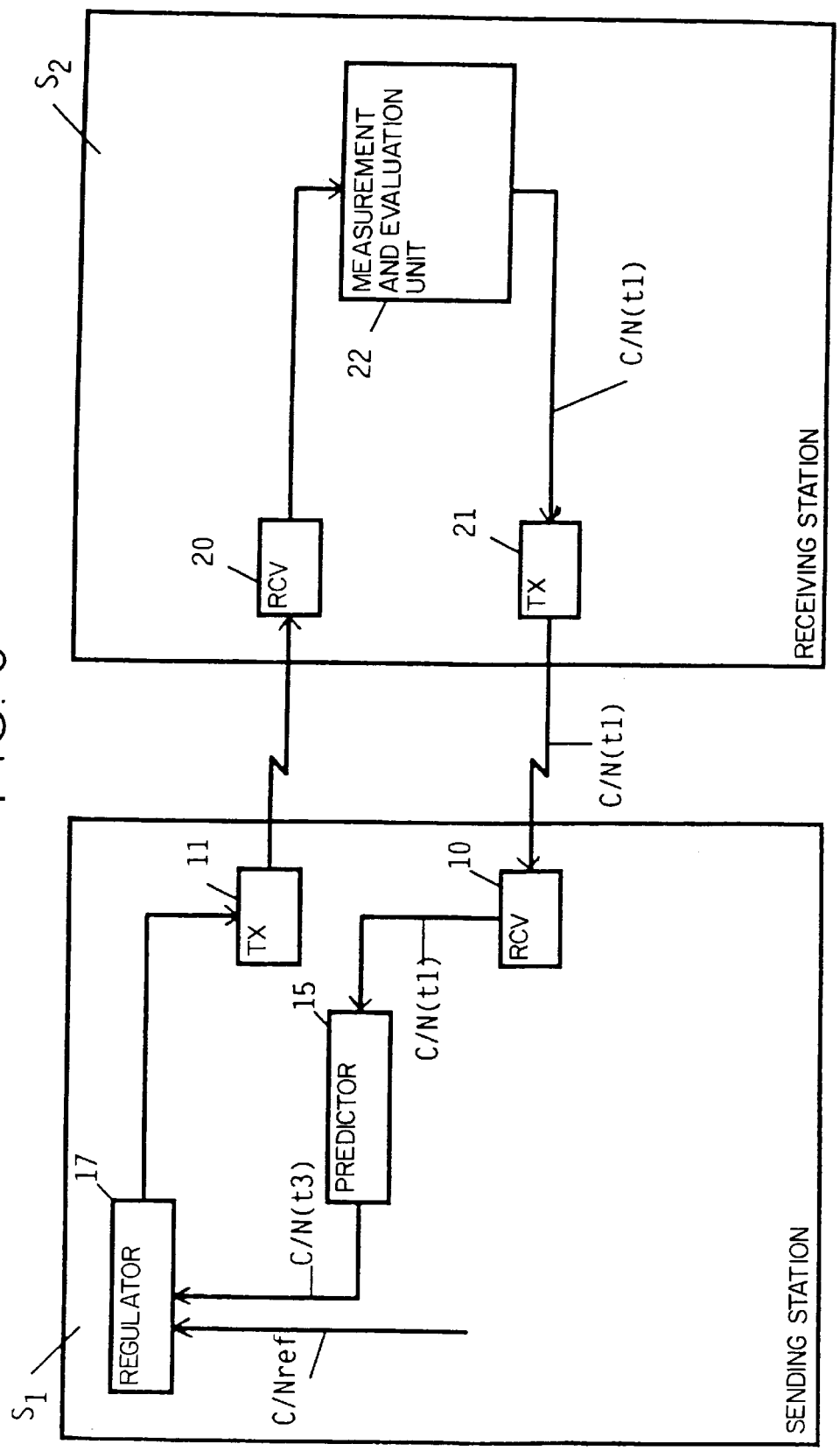
FIG. 3 is a block diagram of the two stations from FIG. 1 for implementing a first embodiment of the method of the invention.

The following description of the method of the invention with reference to FIGS. 2 and 3 concerns only power regulation of the signal transmitted by the sending station S1. The method can be duplicated to correct the power of the signal transmitted by the station S1 and that of the signal transmitted by the station S2. Referring to FIG. 3, the sending station S1 comprises, for implementing the first embodiment of the method of the invention, a receiver 10, a transmitter 11, a prediction unit 15 and a unit 17 for regulating the power transmitted by the transmitter 11. The receiving station S2 comprises a receiver 20, a transmitter 21 and a measurement and evaluation unit 22.

In the station S1, the output of the receiver 10 is connected to an input of the prediction unit 15, an output of which is connected to a first input of the regulator unit 17. A second input of the regulator unit 17 receives a reference signal-to-noise level C/Nref. An output of the regulator unit 17 is connected to a control input of the transmitter 11. The input of the transmitter receiving data to be transmitted is not represented.

In the station S2, an output of the receiver 20 is connected to an input of the transmitter through the measurement and evaluation unit 22.

The method of the invention will now be described, with occasional reference to FIG. 2 in connection with characteristic times crucial to understanding the invention, but it goes without saying that in practise the method is applied continuously in an iterative way to achieve continuous regulation of the power transmitted by the transmitter 11. The example concerns CDMA transmission but TDMA and FDMA, etc., transmissions are equally in the scope of the invention.

At time t0, the transmitter 11 of the station S1 sends a signal having a given power. This signal is received by the receiver 20 in the station S2 at time t1, with a time delay (t1−t0) equal to the time propagation between both stations S1 and S2. It is assumed that the signal transmitted by the transmitter 11 is a direct sequence spread spectrum signal. This signal results from using a pseudo-random sequence to modulate a two-state ("+1" and "−1") data signal. This technique spreads the spectrum of the transmitted signal across the entire available bandwidth of the channel. The pseudo-random sequence functions as a modulation carrier the phase of which is shifted in a pseudo-random manner at a given maximum frequency F. T=1/F defines the duration of a rectangular pulse or "chip" of the pseudo-random sequence. This time T is called the chip time duration.

During a phase of synchronizing the stations S1 and S2, the pseudo-random sequence is transmitted without modulation so that the station S2 can synchronize to the pseudo-random sequence to enable demodulation of the modulated signal subsequently received during the transmission phase. Knowing the pseudo-random sequence, the receiver 20 can demodulate the received signal to obtain a received data signal. The received signal includes a useful signal component C(t) and a noise signal component N(t). This received signal or part of it is applied to an input of the measurement and evaluation unit 22. The latter includes a low-pass filter (having a cut-off frequency of 100 Hz for example) rejecting low-frequency noise components in the received data signal. The output of this low-pass filter is therefore approximately the useful signal component C(t1) in the signal received at time ti, the low-frequency noise component having been rejected by the filter. By subtracting this useful signal component C(t1) of the received signal from the received signal [C(t)+N(t)], the unit 22 obtains the noise component N(t1) in the signal received at time t1. Note that these measurements of the signal component C(t1) and the noise component N(t1) by the unit 22 can be replaced by measurement of any two values respectively representative of the powers of the useful signal and noise. The unit 22 thus evaluates the signal-to-noise ratio C/N(t1) in the signal received at time ti by dividing the component C(t1) by the component N(t1). The ratio C/N can equally well be replaced by the ratio Eb/No, and likewise C can be replaced by Eb and N by No. Amplitude detection would be equally suitable.

This evaluated value of the signal-to-noise ratio is transmitted to the station S1 via the transmitter 21. for example in the form of a message. The receiver 10 of the station S1 receives this message at time t2 (FIG. 2) with a time delay (t2−t1) relative to the time t1 at which the station S2 sends the message. The evaluated value of the signal-to-noise ratio C/N(t1) is then transmitted to the prediction unit 15. This unit 15 has previously received a plurality P of evaluated values of the signal-to-noise ratio of the signal received by the station S2, for respective successive times tp, t(p+1), t(p+2), etc preceding time t1. These successive evaluated values of the signal-to-noise ratio, like C/N(t1), are obtained from measurements by the station S2 at said times preceding time t1 of a plurality of power levels of the second signal and evaluation of a respective signal-to-noise ratio value for the signal received by S2 for each level of this plurality P of measured power levels of the second signal. This is the result of the iterative nature of the method of the invention which offers continuous regulation of the power transmitted by the station S1.

The function of the prediction unit 15 is to predict by extrapolation a signal-to-noise ratio value C/N(t3) at a time t3 which coincides with the time at which the station S2 receives a signal which is transmitted by the station S1 at time t2 (see FIG. 2). The prediction unit 15 can additionally have a limiter function to eliminate unwanted noise that may appear on the link.

Accordingly, at time t2, the station S1 has the predicted signal-to-noise ratio value C/N(t3) and, using this value C/N(t3), is able to regulate the power of the signal transmitted by S1 at time t2 in order to influence the value of the signal-to-noise ratio of the signal received by the station S2 at time t3. Thus by predicting a value of the signal-to-noise ratio of the signal received by S2 at time t3 and given the propagation time between the stations S1 and S2, it is possible to regulate at time t2 the power transmitted by the transmitter 11 in order to modify advantageously the signal-to-noise ratio value of the signal actually received by the station S2 at time t3. For this purpose, it appears particularly advantageous for the measurement by the station S2 of the last of the plurality of power levels required for the extrapolation to precede the time t3 by a time period substantially equal to the round trip propagation time between stations S1 and S2. This produces a predicted signal-to-noise ratio value C/N(t3) for the signal received by S2 at time t3 resulting from an optimal extrapolation time given that the round-trip propagation time between the two stations S1 and S2 cannot be reduced. This is because, obviously, the shorter term the extrapolation is made the more accurate it will be.

In practise, the prediction unit is, for example, a processor unit which uses a second order Taylor series expansion to predict C/N(t3) according to the plurality P of measured signal-to-noise ratio values and the round trip propagation time (t3–t1) between the stations S1 and S2. More generally, the processor unit can be in the form of an adaptive filter. It also can be in the form of a neuron network.

In this first embodiment of the invention, the power of the transmitted signal is regulated or corrected at time t2 according to the predicted signal-to-noise ratio value C/N(t3) and the reference signal-to-noise ratio value C/Nref. The power transmitted by the transmitter 11 of the station S1 at time t2 is regulated so that the signal-to-noise ratio of the signal actually received at time t3 by the receiver 20 in the station S2 is as close as possible to the value C/Nref. Thus if C/N(t3) is greater than C/Nref, the transmit power is reduced. Conversely, if C/N(t3) is less than C/Nref, the transmit power is increased.

The prediction unit 15 could be included in the receiving station S2, in which case the information transmitted by the station S2 to the station S1 would be predicted signal-to-noise ratio values C/N(t3) rather than evaluated signal-to-noise ratio values C/N(t1). Also, the evaluation part of the measurement and evaluation unit 22 could be included in station S1, in which case the information transmitted by the station S2 to the station S1 would be measured power level values rather than evaluated signal-to-noise ratio values C/N(t1).

The invention improves the quality of the data transmission link between the two stations S1 and S2. In the FIG. 3 embodiment, it is assumed that this quality is directly related to the signal-to-noise ratio. This is not strictly true since in practise the quality is associated with the signal-noise ratio in a manner that depends on the nature of the connecting channel, in terms of noise, etc. The connecting channel has characteristics that vary.

Figure 4:
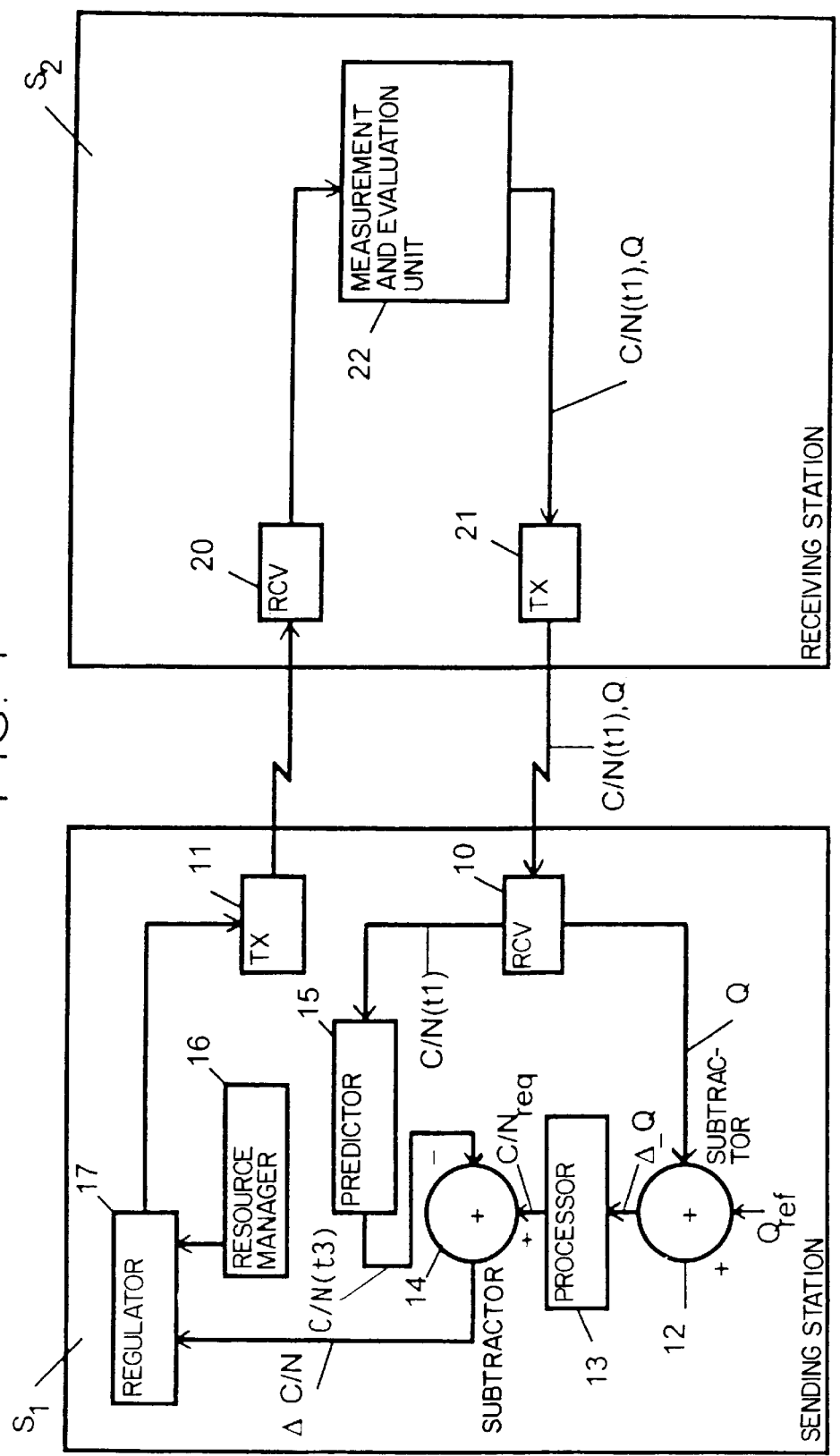
FIG. 4 is a block diagram of the two stations from FIG. 1 for implementing a second embodiment of the method of the invention.

In the second embodiment of the invention shown in FIG. 4, this is taken into account to improve the first embodiment of the method. As shown in this figure, the transmitter 11, the receiver 10, the prediction unit 15 and the regulator unit 17 in the station S1 and the receiver 20, the transmitter 21 and the measurement unit 22 in the station 22 are the same as in FIG. 3.

In this second embodiment, the station S1 further includes a first subtractor 12, a processor unit 13, a second subtractor 14 and, optionally, a resource management unit 16. A second output of the receiver 10 is connected to a first input of the subtractor 12, a second input of which receives a reference quality level Qref. The output of the subtractor 12 is connected to an input of the processor unit 13 an output of which is connected to a first input of the subtractor 14. A second input of the subtractor 14 is connected to the output of the prediction unit 15. A first input of the regulator unit 17 is connected to the output of the subtractor 14 and a second input of the unit 17 is connected to the output of the resource management unit 16.

This embodiment of the method of the invention is implemented as follows: as in the previous embodiment, the measurement and evaluation unit 22 in the station S2 evaluates signal-to-noise ratio values C/N(t1) from measured power levels of the signal received from the station S1. For implementing this second embodiment, the unit 22 measures an average quality level Q of the signal received by the station 52 over a relatively long time period. Taking time ti as the reference point for evaluating a predicted signal-to-noise ratio value C/N(t1), prior to transmission, the relatively long time period advantageously expires at time t1. An evaluated signal-to-noise ratio value C/N(t1) and an average quality level Q are then transmitted by the station S2 to the station S1, substantially at time t1, in the form of a message. In response to receiving the value C/N(t1), the prediction unit 15 delivers the predicted signal-to-noise ratio value C/N(t3). The average quality level Q (for example, a bit error rate or a frame error rate) is subtracted from the reference quality level Qref in the subtractor 12. The output of the subtractor 12 delivers a quality difference value ΔQ applied to an input of the processor unit 13. The latter establishes a required signal-to-noise ratio value C/Nreq on the basis of the quality difference value ΔQ.

The function of unit 13 is to slave the cyclically measured level Q to the reference quality level Qref. Accordingly, if the quality difference value is greater than 0, the processor unit 13 reduces the current value of C/Nreq. Conversely, if the quality difference value is less than 0, the unit increases the current value of C/Nreq. This therefore takes into account the fluctuating nature of the characteristics of the transmission channel. The predicted signal-to-noise ratio value C/N(t3) is subtracted from this required signal-to-noise ratio value C/Nreq to produce a required signal-to-noise ratio variation ΔC/N. The regulator unit 17 regulates the power of the signal transmitted at time t2 (FIG. 2) by the transmitter 11 according to the predicted value C/N(t3) and depending on the required variation ΔC/N of this predicted signal-to-noise ratio value (C/N(t3). The required variation in the predicted signal-to-noise ratio value depends on the difference between the measured average quality level Q and the reference quality level Qref. Note that the means 12, 13 and 14 specific to this embodiment can be included either in the station S1 or in the station S2, in particular according to whether the prediction unit 15 is in the station S1 or the station S2.

The function of the resource management unit 16 is to supply the regulation unit 17 with information on the setting up and closing down of transmission channels. In controlling the transmit power, the regulation unit 17 thus takes a priori account of the effects induced on one channel by other channels newly set up or closed down.

By way example, the relatively long time period for evaluation may range from 0.2 to 100 seconds, and may be adjusted as a function of the channel type.

The invention described above is particularly advantageous, by way of example, in code division multiple access (CDMA) transmission, since it allows the reduction of the transmit power of terminals, and a consequent increase in the satellite system capacity It will be appreciated that further changes and modifications can be made to the disclosed embodiments without departing from the spirit and scope of the invention as defined in the appended claims. For example, the outputs of the processor 13 and predictor 15 in the embodiment of FIG. 4 could be applied directly to the regulator 17 for subtraction internally of the regulator 17, as is the case in the embodiment of FIG. 3. Indeed, a number of the components, e.g., 15 and 17 in FIG. 3, or 12–17 in FIG. 4, could be combined into a single processor with much of the method practiced in software.

What we claim is:

1. A method for regulating the power of a first signal transmitted via a satellite by a first station at a first time to be received in the form of a second signal by a second station at a second time, said method comprising the steps of:

predicting at a given time no later than said first time a value representative of a signal-to-noise ratio of said second signal at said second time, and regulating said power of said first signal at a time no later than said first time and as a function of said predicted signal-to-noise ratio representative value;

wherein said prediction step comprises the substeps of:

measuring at said second station before said given time a plurality of power levels of said second signal, evaluating a respective representative value of a signal-to-noise ratio of said second signal for each of said plurality of measured power levels of said second signal, and extrapolating said predicted value according to said evaluated representative values.

2. A method according to claim 1, wherein the last of said plurality of said power levels of said second signal to be evaluated for said extrapolation step is measured at said second station at a time which precedes said second time by a time period substantially equal to the round-trip propagation time between said first and second stations.

3. A method for regulating the power of a first signal transmitted via a satellite by a first station at a first time to be received in the form of a second signal by a second station at a second time, said method comprising the steps of:

predicting at a given time no later than said first time a value representative of a signal-to-noise ratio of said second signal at said second time, regulating said power of said first signal at a time no later than said first time and as a function of said predicted signal-to-noise ratio representative value, and monitoring a quality of said second signal, which quality is other than a quality calculated from a signal-to-noise ratio, over a relatively long time period prior to said given time, and wherein regulation of the power of said first signal according to said predicted value is applied at said first time dependent on both said predicted signal-to-noise ratio representative value and said monitored quality.

4. A method according to claim 3, wherein said relatively long time expires substantially at said given time.

5. A method according to claim 3, wherein said relatively long time period expires at a time preceding said first time by approximately the one-way propagation time of a signal transmitted from said second station to said first station.

6. A method according to claim 3, wherein said regulating step comprises the steps of comparing a level of said monitored quality to a reference level of said monitored quality to obtain a quality difference, determining a required variation of signal-to-noise ratio in accordance with said quality difference and said predicted signal-to-noise ratio, and regulating said power level in accordance with said required variation.

7. In a satellite communication system, a set of stations comprising at least first and second stations, said first station transmitting via satellite a first signal at a first time which is received in the form of a second signal by said second station at a second time, said second station comprising:

means for measuring a plurality of power levels of said second signal, means for evaluating a respective representative value of a signal-to-noise ratio of said second signal for each of said plurality of measured power levels of said second signal, and means for generating at a given time a predicted value of a signal-to-noise ratio of said second signal which will be received at said second time, as a function of said evaluated representative values, means for transmitting said predicted value to said first station, and said first station comprising:

means for regulating a power of said first signal at said first time as a function of said predicted value.

8. A set of stations according to claim 7, wherein said second station further comprises means for monitoring a quality of said second signal, which quality is other than a quality calculated from a signal-to-noise ratio, over a relatively long time period, and said regulating means regulates said power as a function of both said predicted signal-to-noise ratio and said monitored quality.

9. A set of stations according to claim 8, further including means at either of said stations for comparing a level of said monitored quality to a reference level of said monitored quality to obtain a quality difference, and means at either of said stations for determining a required variation of signal-to-noise ratio in accordance with said quality difference and said predicted signal-to-noise ratio, and wherein said regulating means at said first station regulates said power level in accordance with said required variation.

10. In a satellite communication system, a set of stations comprising at least first and second stations, said first station transmitting via satellite a first signal at a first time which is received in the form of a second signal by said second station at a second time, said second station comprising:

means for measuring a plurality of power levels of said second signal, means for transmitting said measured power levels to said first station, and said first station comprising:

means for evaluating a respective representative value of a signal-to-noise ratio of said second signal for each of said plurality of measured power levels of said second signal, and means for generating a predicted value of a signal-to-noise ratio of said second signal which will be received at said second time, as a function of said evaluated representative values, and means for regulating a power of said first signal at said first time as a function of said predicted value.

11. A set of stations according to claim 10, wherein said second station further comprises means for monitoring a quality of said second signal, which quality is other than a quality calculated from a signal-to-noise ratio, over a relatively long time period, and said regulating means regulates said power as a function of both said predicted signal-to-noise ratio and said monitored quality.

12. A set of stations according to claim 11, further including means at either of said stations for comparing a level of said monitored quality to a reference level of said monitored quality to obtain a quality difference, and means at either of said stations for determining a required variation of signal-to-noise ratio in accordance with said quality difference and said predicted signal-to-noise ratio, and wherein said regulating means regulates said power level in accordance with said required variation.

13. In a satellite communication system, a station for receiving in the form of a second signal at a second time a first signal which is transmitted by another station at a first time, comprising:

means for measuring a plurality of power levels of said second signal, means for evaluating a respective representative value of a signal-to-noise ratio in said signal for each of said plurality of measured power levels of said second signal, and means for generating a predicted value of a signal-to-noise ratio of said second signal which will be received at said second time, as a function of said evaluated representative values, and means for transmitting said predicted value to said another station.

14. In a satellite communication system, a first station comprising:

means for receiving via satellite from a second station a predicted value of a signal-to-noise ratio at said second station of a second signal which will be received at a later time by said second station as a result of a first signal transmitted from said first station which is received in the form of said second signal by said second station, and means for regulating, at a time preceding said later time by a time period substantially equal to a propagation time between said first and second stations, a power of said first signal transmitted by said first station as a function of said predicted value.

15. In a satellite communication system, a first station comprising:

means for receiving via a satellite from a second station a plurality of power levels of a signal which is received by said second station as a result of a first signal transmitted from said first station, means for evaluating a respective representative value of a signal-to-noise ratio of said second signal for each of said plurality of measured power levels of said second signal, means for generating a predicted value of a signal-to-noise ratio of said second signal which will be received at a later time by said second station, as a function of said evaluated representative values, and means for regulating, at a time preceding said later time by a time period substantially equal to a propagation time between said first station and said second station, a power of a first signal transmitted by said first station as a function of said predicted value.

16. A station according to claim 15, wherein said first station further receives from said second station a measurement of a quality of said second signal, which quality is other than a quality calculated from a signal-to-noise ratio, over a relatively long time period, and comprises means for adjusting a required variation of said predicted signal-to-noise ratio representative value in said first station as a function of the difference between said measured average quality level and a reference quality level, wherein said means for regulating regulates said power as a function of both said predicted value and said quality measurement.

17. A station according to claim 16, wherein said first station includes means for comprising level of quality measurement to a reference level of said quality to obtain a quality difference, and means for determining a required variation of signal-to-noise ratio in accordance with said quality difference and said predicted signal-to-noise ratio, and wherein said regulating means regulates said power level in accordance with said required variation.

* * * * *